United States Patent [19]
Fosslien

[11] 3,896,021
[45] July 22, 1975

[54] AUTOMATED ELECTROPHORESIS INSTRUMENT
[75] Inventor: Egil Fosslien, Columbia, Mo.
[73] Assignee: The Curators of the University of Missouri, Columbia, Mo.
[22] Filed: Oct. 22, 1974
[21] Appl. No.: 516,982

[52] U.S. Cl............................ 204/299; 204/180 S
[51] Int. Cl.............................................. B01k 5/00
[58] Field of Search............. 204/180 S, 180 G, 299

[56] References Cited
UNITED STATES PATENTS
| | | | |
|---|---|---|---|
| 3,303,120 | 2/1967 | Hrdina | 204/300 |
| 3,497,441 | 2/1970 | Paksi | 204/180 G |
| 3,594,263 | 7/1971 | Dwyer et al. | 204/299 X |
| 3,764,513 | 10/1973 | Saravis | 204/180 G X |

*Primary Examiner*—John H. Mack
*Assistant Examiner*—A. C. Prescott
*Attorney, Agent, or Firm*—Ray E. Snyder

[57] ABSTRACT

An electrophoresis instrument that is totally automated in the application, electrophoretic separation, photometric scanning and quantitation of various molecules, wherein, separation under the influence of an electric field takes place on the surface of a cellulose acetate medium that is supported on a segmented pliable plastic tape. Electrophoretic separation of a multitude of samples takes place simultaneously under identical conditions.

8 Claims, 11 Drawing Figures

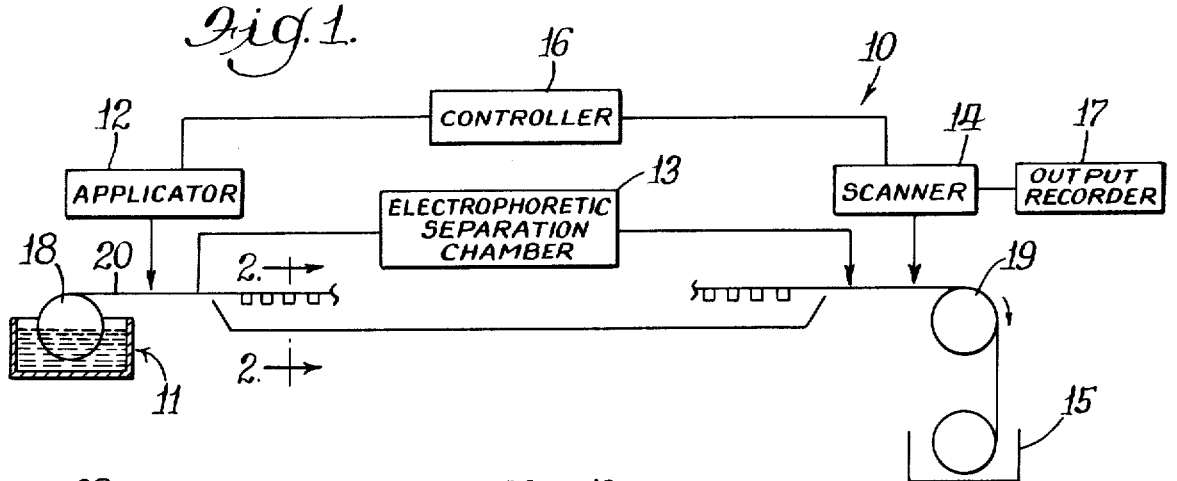
Fig. 1.
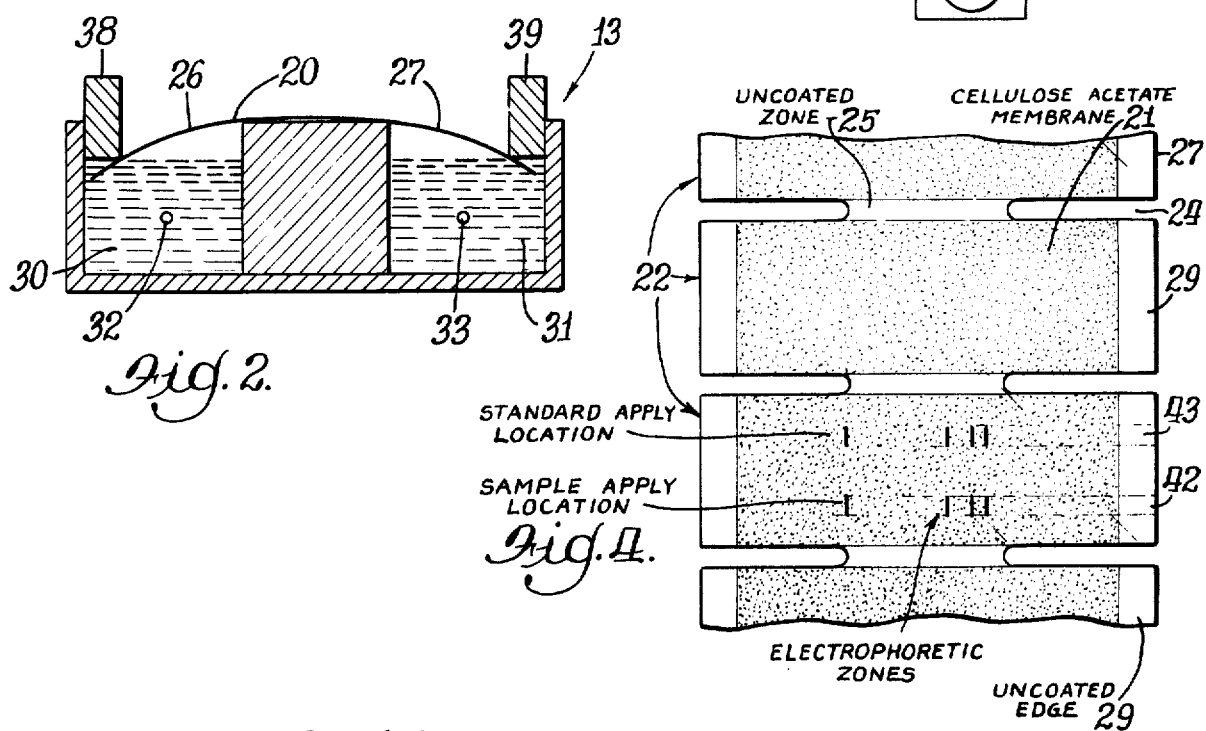
Fig. 2.
Fig. 4.
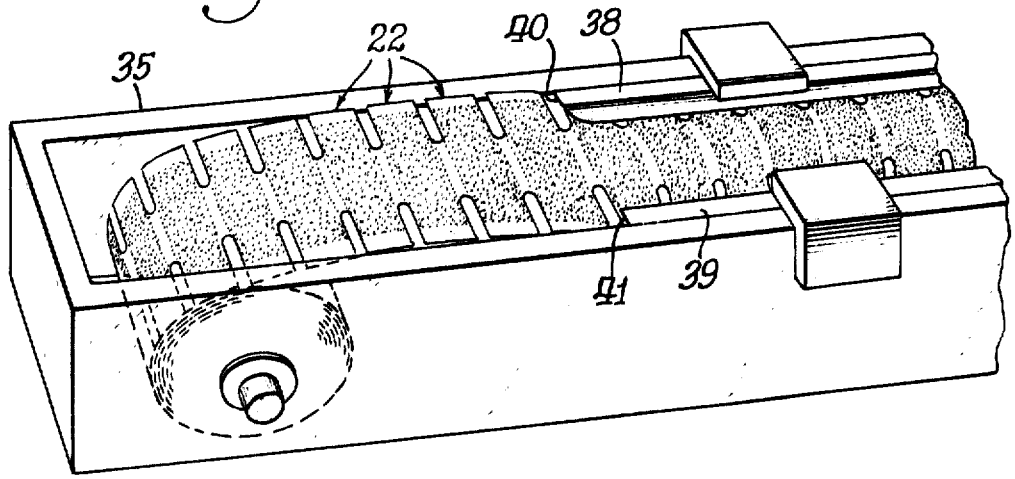
Fig. 3.

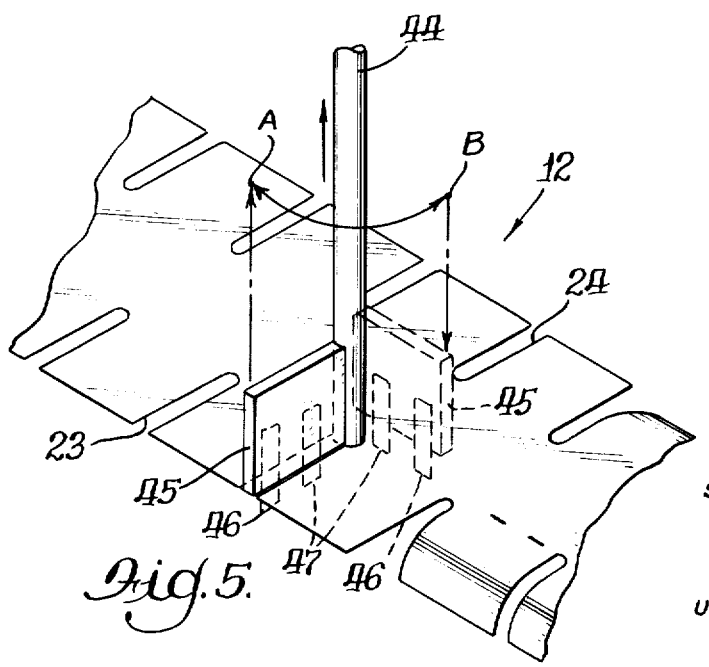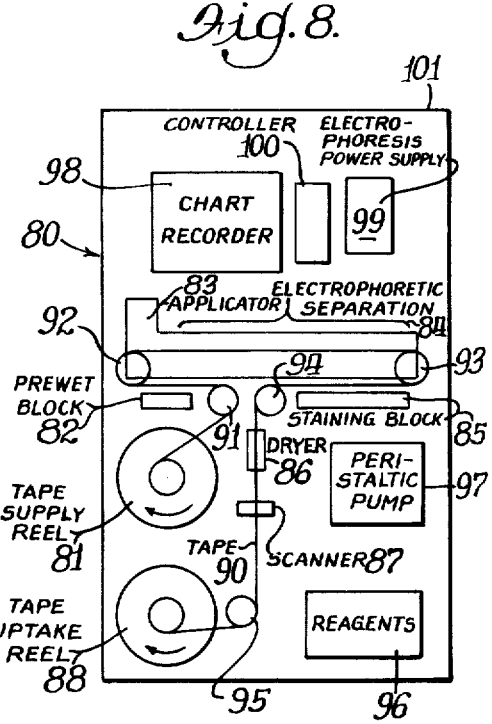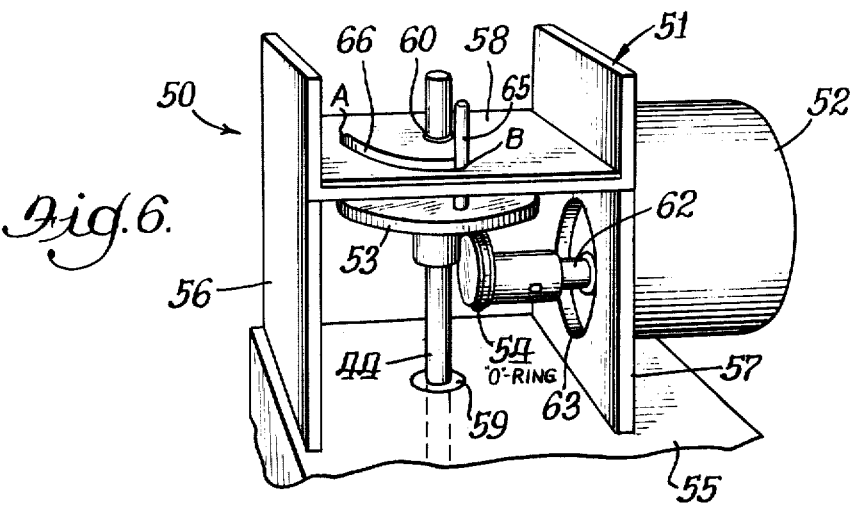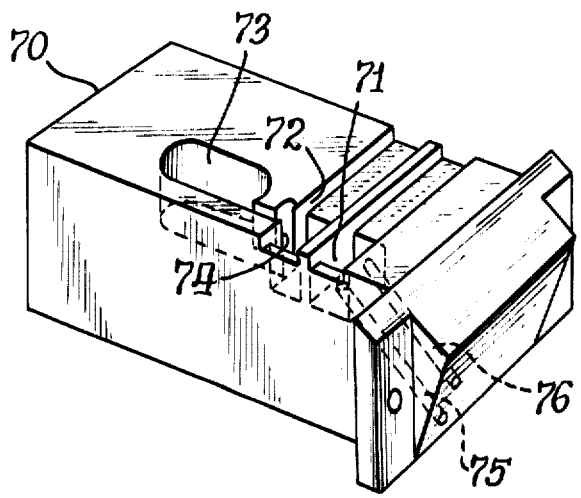

3,896,021

AUTOMATED ELECTROPHORESIS INSTRUMENT

BACKGROUND OF THE INVENTION

The invention described herein was made in the course of work under a grant or award from the Department of Health, Education, and Welfare.

Field of the Invention

This invention relates generally to the field of Chemistry wherein Electrical Energy is utilized to produce the Electrophoretic separation of molecules. More particularly, this invention relates to a totally automated apparatus for performing the steps of applying, separating, and scanning samples on a segmented tape.

Description of the Prior Art

The principles of electrophoresis are known in the art using paper, starch gel, cellulose acetate, or agarose gel as media during electrophoretic separation. Other techniques for electrophoretic separation include isoelectric focusing, electrical field-flow fractionation and the use of optical mixing of scattered light from molecules in motion in an electrical field. However, isoelectric focusing and electrical field-flow fractionation are relatively slow procedures and the optical mixing method is still in the early development stages.

A number of electrophoresis instruments have been reported which, purportedly, were automated. These include sucrose gradient, continuous flow, and agar gel electrophoresis apparatus. Some of the devices reported process only one sample at a time in a separation chamber, which is a very time consuming process. Other devices reported still require loading by hand or samples have to be applied by hand, or the separation medium must be exchanged manually after each batch of samples.

SUMMARY OF THE INVENTION

It is an object of the present invention to provide an electrophoresis instrument that is totally automated from the steps of sampling through application, separation, staining, scanning and print out. A multitude of samples are processed simultaneously. A reference or standard solution for comparison is applied with each sample. The instrument produces more consistent staining and separation since each sample is exposed to exactly the same process.

It is another object to provide an electrophoresis instrument utilizing a segmented, pliable, plastic tape coated with a suitable electrophoretic medium to which a sample and a standard are applied for each segment. The tape also provides a permanent record of each analysis.

The segments of the tape are disposed transversely along the length of the tape and each segment is electrically isolated from adjacent segments. The tape is caused to be moved linearly along a separation chamber and the free ends of each segment are caused to be deflected downward so that the coating on the tape segment ends make electrical contact with a positive and a negative electrolyte, respectively. An electric field is applied across the segment and electrophoretic separation takes place on the surface of each segment.

BRIEF DESCRIPTION OF THE DRAWINGS

FIG. 1 is a schematic diagram of the automated electrophoresis instrument of the present invention;

FIG. 2 is an enlarged cross-sectional view of the electrophoretic separation chamber, taken on line 2—2 of FIG. 1;

FIG. 3 is a perspective view of the segmented tape and separation chamber;

FIG. 4 is an enlarged and detailed front view of the segmented tape;

FIG. 5 is a perspective view of the applicator illustrating its operational movements;

FIG. 6 is a perspective view of the mechanism for operating the applicator;

FIG. 7 is a perspective view of the sample well and standard solution well used with the applicator;

FIG. 8 is a schematic illustration of a complete instrument.

DETAILED DESCRIPTION OF THE DRAWINGS

Figure 7A:
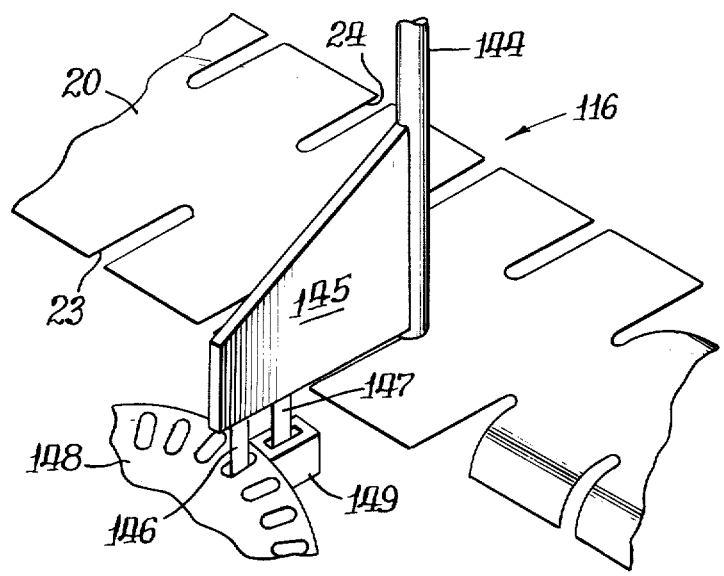
FIG. 7A is a fragmentary perspective illustration of an alternative form of applicator in conjunction with an indexed rotary sample wheel.

The automated electrophoresis instrument of the present invention is illustrated schematically in FIG. 1 and is designated generally by the numeral 10. The instrument 10 comprises: a tape wetting tank 11, an applicator 12, an elongated electrophoretic separation chamber 13, a scanner 14, a take-up mechanism 15, a controller 16, and an output recorder 17. The instrument 10 also includes tape drive sprockets or spools 18 and 19 which are actuated by electrical stepping motors (not shown). A segmented, flexible plastic tape 20 is used in conjunction with the instrument 10.

The tape 20 is illustrated in greater detail in FIGS. 3 and 4. The tape 20 preferably is made of Mylar and is coated with a cellulose acetate surface 21; however, other types of tapes and coatings may also be employed. The tape 20 is divided into segments 22 by cutting transverse slots 23 and 24 partially across the body of the tape. Each of the segments 22 are electrically isolated from each other by an uncoated zone 25 extending transversely across the tape and joining the slots 23 and 24. Cutting the tape 20 in the manner described leaves a pair of transversely extending tongues or tabs 26 and 27. Each of the tabs 26 and 27 have an uncoated outer edge 28 and 29, respectively.

The tabs 26 and 27 are flexible and can be deflected downward into electrolyte solutions 30 and 31 contained in the electrophoretic separation chamber 13, as shown in FIG. 2. The uncoated outer edges 28 and 29 provide contact surfaces for deflecting the tabs 26 and 27 and avoids flaking of the acetate coating 21 from the tape 20. It was found that the slotted structure of the tape 20 was important to prevent buckling and distortion of the tape as it moves through the separation chamber 13.

The separation chamber 13 also includes linear electrodes 32 and 33 disposed within the electrolyte solutions 30 and 31 and extending along the length of the chamber 13. The electrodes 32 and 33 are connected to a suitable DC power source (not shown) and are effective to establish a uniform electric field transversely across the tape segments 22.

Referring to FIGS. 2 & 3, the separation chamber 13 is seen to comprise an elongated rectangular tank 35 having a raised wall or rail 36 extending longitudinally down its center. The rail 36 divides the tank 35 into two wells for holding the electrolyte solutions 30 and 31. The tape 20 is caused to move longitudinally along the upper surface 37 of the rail 36. A pair of deflecting rails or blocks 38 and 39 are mounted along the upper edge of the tank 35. The rails 38 and 39 are formed with tapered ramps or leading edges 40 and 41, respectively. The ramps 40 and 41 contact the uncoated edges 28 and 29 and deflect the tabs 26 and 27 downward so as to make electrical contact with the respective electrolytes 30 and 31. The rails 38 and 39 hold the tabs of the segments 22 in contact with the electrolytes as the tape 20 traverses the length of the separation chamber 13.

It is contemplated that the rate of processing may be approximately one segment per minute. This means that in a separation chamber 24 inches long, a nominal twenty three segments 22 may be exposed to the electric field at one time. Some variability may occur in the strength of the electric field and the development time, but I have found that twenty three minutes for development produces excellent results. Acceptable results are obtained within 15 minutes.

The applicator 12 for applying the samples and standard solutions to the tape segments 22 is shown in FIG. 5. The applicator 12 comprises a vertically mounted shaft 44 and a radial blade 45 attached to the shaft 44. The blade 45 carries a stylus 46 for applying the sample and a stylus 47 for applying the standard solution.

The shaft 44 is mounted for movement axially and arcuately about its axis. In the position A, shown in FIG. 5, the shaft 44 and blade 45 are depressed so that the styluses 46 and 47 extend through a slot 23 in the tape 20 and are dipped in the liquid sample and standard solutions. The shaft 44 is then raised axially upward until the styluses 46 and 47 clear the surface 21. The shaft 44 is then turned arcuately about its axis approximately 90° into the position B as shown. The shaft 44 is then depressed again so that the styluses 46 and 47 contact the surface 21 and apply the sample and standard solution to the tape 20. The shaft 44 is then raised again and turned back to its original A position and the tape 20 is advanced one segment 22. The stylus 46 is washed by pumping water into the sample well; the water is removed and the next sample is introduced into the sample well, and the cycle is repeated.

The mechanism 50 for producing the desired motions of the shaft 44 is illustrated in FIG. 6. The mechanism 50 comprises a mounting frame 51, a reversible electric drive motor 52, a friction drive plate 53, and an eccentric drive wheel 54. The frame 51 is mounted on a base plate 55 and includes vertical side plates 56 and 57, and a horizontal connecting plate 58. The shaft 44 extends through the base plate 55 and connecting plate 58 and is retained by bearings 59 and 60. The friction drive plate 53 is a circular disc and is mounted concentrically on the shaft 44 within the frame 51. The motor 52 is mounted on the exterior of the side plate 57 and has a rotatable drive shaft 62 which extends through a circular opening 63 in the plate 57. The drive shaft 62 carries the eccentric drive wheel 54 which maintains constant contact with the underside of the disc 53. The disc 53 carries a vertically mounted pin 65 which extends upward through an arcuate slot 66 formed in the connecting plate 58. The ends of the slot 66 are designated as A and B and are the limits of motion of the disc 53 and shaft 44. The ends A and B correspond to the two operative positions shown in FIG. 5.

In operation, the eccentricity of the friction drive wheel 54 produces the raising and lowering of the shaft 44 and the frictional contact with the disc 53 also produces the desired turning of the shaft 44. The ends of the slot 66 limit the degree of rotation in either direction. The electric motor 52 is reversible and is under the influence of the controller 16, which synchronizes its operation with the movement of the tape 20 and other functions performed by the instrument 10.

The liquid sample and standard solution are retained in a well block 70, as shown in FIG. 7. The block 70 is formed with a sample well 71, a standard solution well 72, and a supply reservoir 73 for the standard solution. The well 72 is in communication with the reservoir 73 through a vertical slot 74. The block 70 is also formed with a sample supply conduit 75 for introducing the sample into the bottom of the well 71 and an overflow conduit 76 formed through the side wall of the well 71.

For each application, a new sample is introduced into the well 71 through the conduit 75. After application on the tape 20, the sample is aspirated from the well 71, the well 71 if flushed with water and the stylus 46 is dipped into the water for removing residue of the previous sample. The water is then removed and the new sample introduced into the well 71, and the cycle is repeated.

Figure 7B:
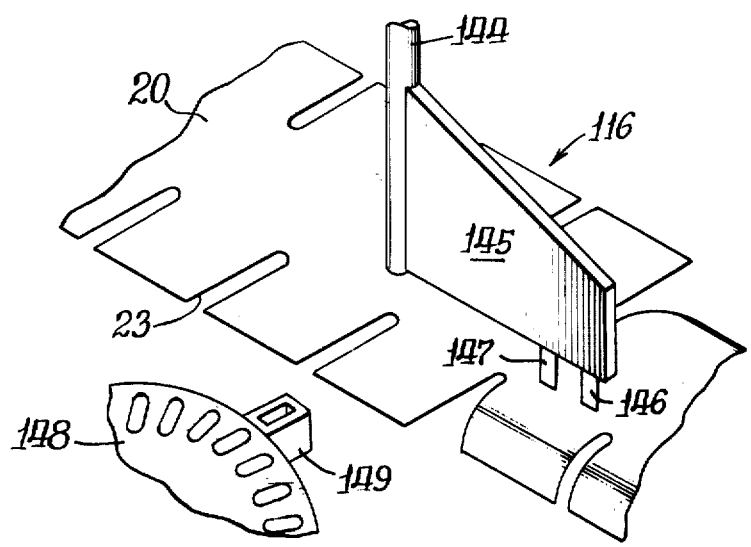
FIG. 7B is a view of the applicator of FIG. 7A as used to apply the sample and standard solutions to the tape.
Figure 7C:
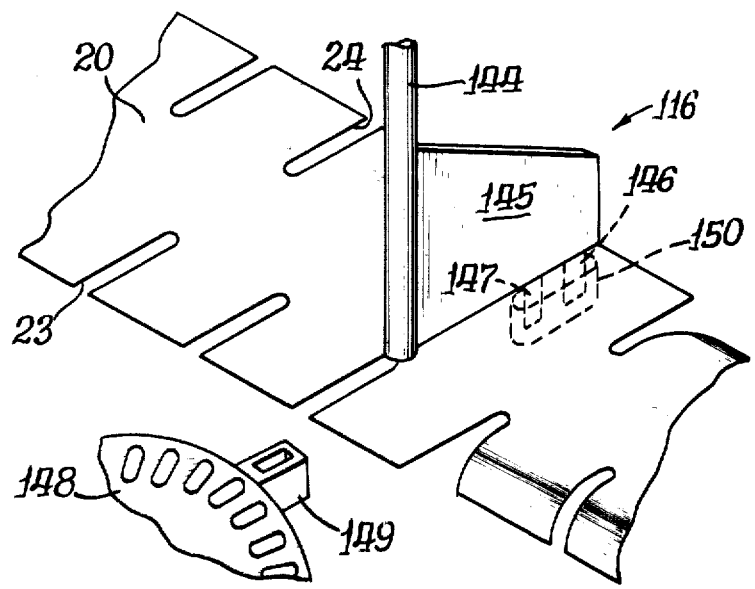
FIG. 7C is a view of the applicator of FIG. 7A in the wash portion of the cycle of operation.

An alternative embodiment of the applicator is shown in FIGS. 7A, 7B, and 7C and is designated by the numeral 116. The applicator 116 comprises a vertical shaft 144, an elongated radial blade 145 carrying styluses 146 and 147, a rotary indexed sample wheel 148, a standard solution well 149, and a wash well 150. The wheel 148 is formed with a plurality of wells 151 around its perimeter and each is filled with a separate sample.

In operation, the shaft 144 and blade 145 are lowered to dip the styluses 146 and 147 simultaneously into the sample well 151 and standard well 149. The blade 145 is then raised and turned 90° to the position shown in FIG. 7B. The blade 145 is then lowered to bring the styluses 146 and 147 into contact with the tape 20. The blade 145 is raised again, the tape 20 is indexed one segment, and the blade 145 is turned to the position shown in FIG. 7C. The blade 145 is then lowered again so that the styluses extend through a slot 24 of the tape 20 and are dipped into the well 150 for washing.

It should be noted that in this embodiment, the segment 22 to which the sample is applied is displaced longitudinally one unit from the embodiment shown in FIG. 5.

In operation, the tape 20 is pre-wetted before the sample and standard solutions are applied. As shown in FIG. 1, the wetting of the tape can be accomplished by partially immersing the tape supply spool 18 in a liquid buffer solution contained in tank 11. Other means of prewetting the tape 20 can also be employed as will be described hereinafter.

As the tape 20 advances into the separation chamber 13, the applicator 12 applies the sample and standard solution to the tape segment 22. The types of marks placed on the tape 20 are indicated in FIG. 4. The tape 20 continues to advance through the separation chamber 13 and the end tabs 26 and 27 are deflected downward into the electrolytes 30 and 31, respectively. The coated tabs 26 and 27 act as wicks to make electrical contact with the electrolyte solutions. The wetted cellulose acetate surface 21 acts as a conductive medium for the electric field established between the electrodes 32 and 33. The electrophoretic separation takes place on the surface 21 while the tape 20 traverses the length of the chamber 13 and appears as indicated in FIG. 4. The patterns established by the electrophoretic separation are defined as lanes 42 and 43 for the sample and standard, respectively. The pattern 43 for the standard should be identical on every segment 22 and serves as a basis of direct comparison with the pattern 42.

As the tape 20 leaves the separation chamber 13, the lanes 42 and 43 for each segment 20 are scanned by the photometric scanner 14, and the signals read are recorded by the output recorder 17. The lanes 42 and 43 may be stained, if desired, to enhance their readability. The scanner 14 may be of the reflectance type when the tape 20 is translucent or opaque. Alternatively, the scanner 14 may be of the direct transmission type when the tape 20 is transparent, or nearly so.

After the signals from each segment 22 have been read by the scanner 14, the tape 20 passes over the drive sprocket 19. The tape 20 then is preferably dried by any suitable means (not shown) and is taken up by the mechanism 15. The take-up spool 15 provides a permanent record of the samples and can be unwound and re-read as desired.

A more complete and comprehensive instrument is illustrated diagrammatically in FIG. 8. The overall instrument is designated by the numeral 80 and comprises a tape supply reel 81, a prewet block 82, an applicator 83, an electrophoretic separation chamber 84, a staining block 85, a drying section 86, a scanner 87, and a tape uptake reel 88. A continuous, segmented tape 90 passes through all of the components 81 – 88 just defined. Sprocket wheels and guide spools 91, 92, 93, 94, and 95 direct the motion of the tape 90 as it passes through the instrument 80.

As the tape 90 is in motion, it passes from the supply reel 81 around the sprocket wheel 91 and is inverted; that is, the coated surface of the tape 90 is exposed downwardly so as to contact the prewet block 82. The tape 90 is then returned to its upright position as it passes around the spool 92. The tape 90 passes through the applicator 83 and electrophoretic separation chamber 84 and is inverted again as it passes around the spool 93. The inverted tape 90 then passes over the staining block 85 and around the sprocket wheel 94. The tape 90 is dried in the drying section 86 before it passes through the scanner 87. After passing through the scanner 87, the tape 90 passes around the sprocket wheel 95 and is taken up by the reel 88.

The instrument 80 also comprises auxilliary equipment including a supply of reagents 96, a multiple-conduit peristaltic pump 97, a chart recorder 98, an electrophoresis power supply 99, and a controller 100. All of the components defined for the instrument 80 are contained within a cabinet or chassis housing 101.

The reagents 96 are supplied by the pump 97 to the staining block 85 and to the prewet block 82, and separation chamber 84 as required. The chart recorder 98 is connected to the scanner 87 and makes a permanent record of the signals read from the tape 90. The power supply 99 provides the electrical energy for the field within the separation chamber 84. The controller 100 is a small special purpose computer that is interconnected to all of the electrical elements and is operable to control the motion of the tape 90 and the operations performed on it.

The preferred embodiments of the instrument described herein have been designed to perform totally automated hemoglobin or protein electrophoresis at the rate of 60 samples and standard per hour. The operational conditions are identical for each sample which insures consistency and uniformity in results of the analysis made for each segment 22 of the tape. The invention shown and described has the additional advantage of providing a permanent, easily accessible record of the analyses made.

It is to be understood that many changes and modifications may be made to the embodiments of the invention shown and described without departing from the spirit of the invention. The invention is to be considered as limited only in-so-far as the claims may be so limited.

I claim:

1. Automated electrophoresis apparatus comprising:
an elongated electrophoretic separation chamber defining a pair of elongated electrolyte wells;
electrolyte media contained within said wells;
electrode means contained within said media;
an elongated, flexible, coated plastic tape divided into transverse segments and mounted for movement longitudinally with respect to said separation chamber;
deflecting means mounted adjacent the top of said separation chamber and operable to flex the lateral ends of the segments of said tape so as to make electrical contact with said electrolyte media; and
a source of DC power connected to said electrode means and operable to establish an electrical field transversely across said tape whereby electrophoretic separation can take place on the coated surface of said tape.

2. The apparatus of claim 1 wherein:
said segments of said tape are separated by transverse uncoated areas so that said segments are electrically isolated from each other.

3. The apparatus of claim 1 wherein:
discrete segments of said tape are formed by transverse slots cut part way through the body of said tape.

4. The apparatus of claim 1 including:
a longitudinally extending central rail mounted lengthwise within said separation chamber and serving to divide and electrically isolate said electrolyte wells from each other, and also serving on its upper surface as a supporting ridge for said tape as it moves longitudinally through said separation chamber.

5. The apparatus of claim 1 including:
applicator means effective to apply simultaneously a liquid sample and a standard solution on the coated surface of one segment of said tape.

6. The apparatus of claim 5 including:
drive means for said applicator comprising:
a reciprocable and arcuately movable drive shaft;
a pair of styluses carried by said shaft and operable to apply the sample and standard solutions, respectively;
a friction drive plate attached to said shaft;
an eccentric drive wheel in frictional contact with said drive plate and operable to cause the reciprocable and arcuate movements of said shaft;

a reversible electric motor connected to drive said drive wheel; and stop means effective to limit the arcuate movement of said shaft.

7. The apparatus of claim 5 including:

electrical drive means connected to move said tape intermittently through said separation chamber; and electrical control means connected to said last named electrical drive means and to said reversible electric motor and operable to synchronize the intermittent movement of said tape with the application of samples and standard solutions to said tape.

8. The apparatus of claim 7 including:

photometric scanning means mounted to read each segment of said tape after it has moved through said separation chamber whereby a permanent record of each electrophoretic separation is recorded.

* * * * *